United States Patent [19]

Lewis

[11] 4,168,811

[45] Sep. 25, 1979

[54] REEL TO RETAIN A TAPE LEADER STRIP IN WOUND POSITION

[75] Inventor: Richard A. Lewis, Sherman Oaks, Calif.

[73] Assignee: Interdyne Company, Van Nuys, Calif.

[21] Appl. No.: 929,263

[22] Filed: Jul. 31, 1978

[51] Int. Cl.² .................... G11B 15/66; B65H 75/28
[52] U.S. Cl. .................... 242/195; 206/53; 242/71.8
[58] Field of Search .............. 242/195, 197, 71.8, 242/74, 74.1, 74.2; 206/53

[56] References Cited

U.S. PATENT DOCUMENTS

| 3,620,474 | 11/1971 | Ray ................................. 242/195 |
| 3,797,777 | 3/1974 | Hosono et al. .................. 242/195 X |
| 3,836,096 | 9/1974 | Fukushima et al. ............. 242/197 |

*Primary Examiner*—George F. Mautz
*Attorney, Agent, or Firm*—William W. Haefliger

[57] ABSTRACT

A storage unit for tape and a leader strip includes a reel, and a disc adjacent one reel flange to deflect as the leader strip is wound into the space between the disc and the other flange.

8 Claims, 5 Drawing Figures

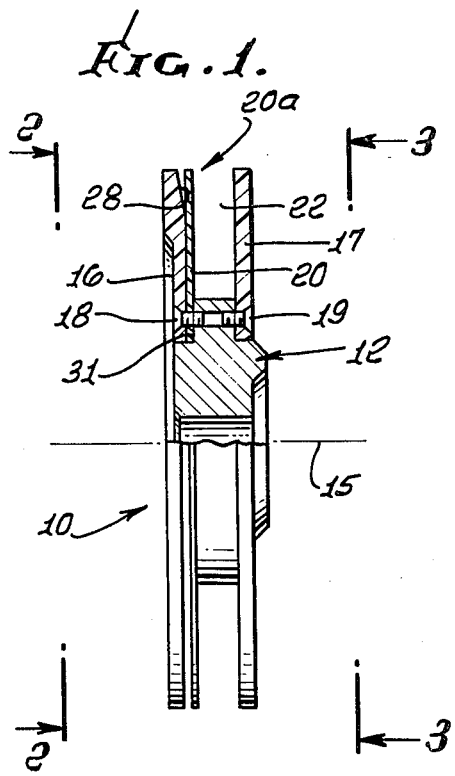
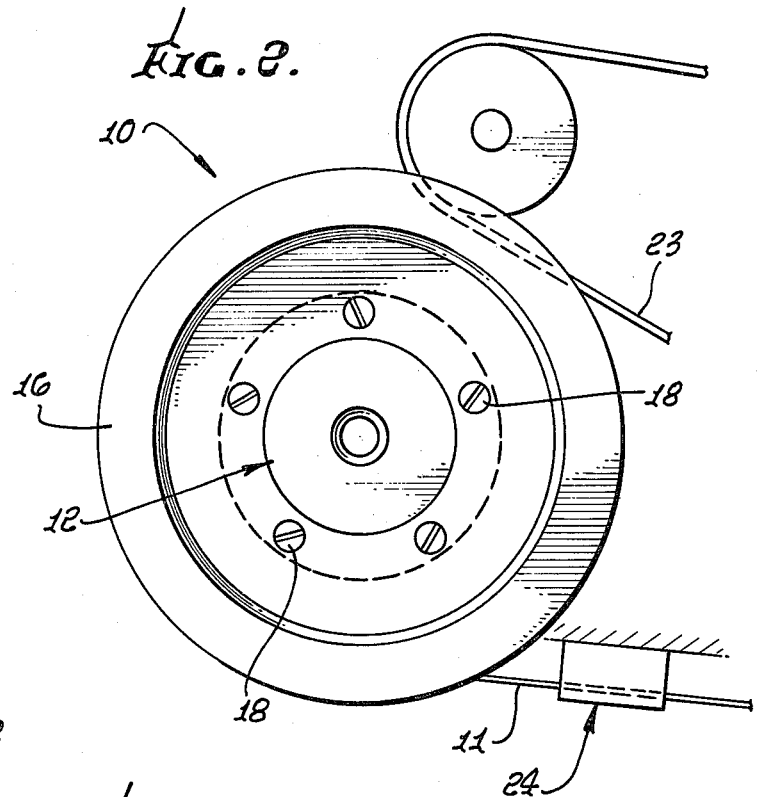
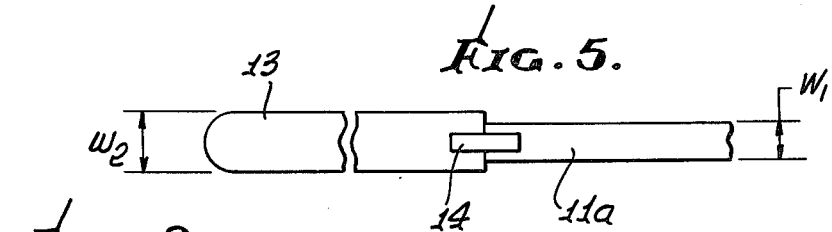
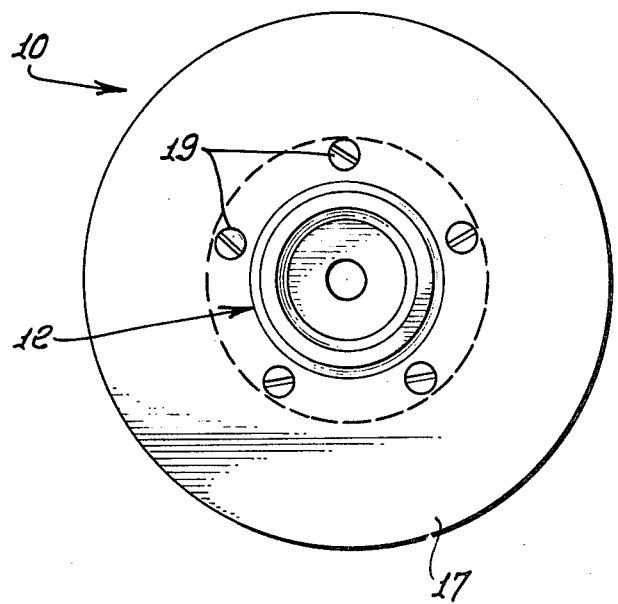
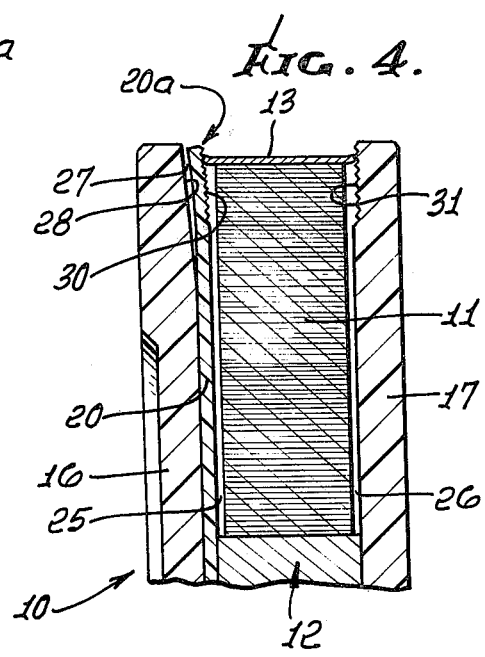

REEL TO RETAIN A TAPE LEADER STRIP IN WOUND POSITION

BACKGROUND OF THE INVENTION

This invention relates generally to tape handling mechanisms, and more particularly concerns the provision of storage means for magnetic tape.

It is desirable to protect tape wound on a reel by providing a protective leader strip which extends about the tape and is retained in position between reel flanges. One way to retain the leader requires the use of grooves cut in the flange walls to receive the leader edges; however, such grooves required exact tolerances since if they are too deep the leader will be loose and will not form a protective seal with the flanges; conversely, if the fit between the tape and grooves is too tight, it becomes unacceptably difficult to remove the leader from between the flanges.

Another expedient is to provide flexible reel flanges; however, they create additional problems in that the leader and tape are released or spilled if a flange flexes too far as can happen if the reel is dropped. Notched edge leader has also been employed; however, such leader does not completely seal off against the flanges so that the tape remains unprotected, i.e one purpose of the leader is destroyed.

Further, if a leader is designed to frictionally engage straight (i.e. ungrooved) walls of the flanges, for retention, it is found that buckling of the leader occurs at random locations about the reel axis as the leader is wound, due to excessive bending stiffness of the leader, lengthwise. This leads to stripping difficulties and uneven winding of the tape about the leader on the take-up reel.

Insofar as I am aware, no-one prior to the present invention has provided a solution to the above problems, which embodies the unusual structural features, function and results of the present invention.

SUMMARY OF THE INVENTION

It is a major object of the invention to provide a tape reel that overcomes the above described difficulties and problems. Basically, the tape storage unit of the present invention is accommodated to an elongated leader strip connected with the tape, the overall width of the leader exceeding the overall width of the tape, and comprises:

(a) a reel having an axis, two protective flanges extending normal to said axis, and a hub about which tape may be wound for storage between the flanges, the flanges carried by the hub to extend in axially spaced, rigidly projecting, generally parallel rotation, (b) and a disc extending annularly about the axis between the flanges and in adjacent relation to one flange, the disc extending generally parallel to the flanges but its outermost annular extent being characterized as locally and circumferentially progressively yieldably deflectible axially toward said one flange in response to interference engagement with the leader strip being forcibly wound into the space between the disc and the other flange, as the reel rotates about the axis.

As will be seen the side of the one flange facing the disc typically has an outer portion provided with annular relief, such as a bevel, to provide clearance adjacent the disc to accommodate its local yieldable deflection as the leader is wound about the tape pack. Also, the sides of the disc and the other flange facing the leader edges are typically made irregular so as to retain the leader edges in wrapped position, while still allowing forcible pull-out of the leader as required. Accordingly, the compliant disc deflects with entry of the leader, allowing protective wrapping of the leader about the tape pack, the two flanges protectively and sidewardly encompass the disc and tape to prevent damage to same, and a resultant very simple cooperative construction is achieved with a number of advantages that are not afforded in prior construction, or by the elements individually.

These and other objects and advantages of the invention, as well as the details of an illustrative embodiment, will be more fully understood from the following description and drawings, in which:

DRAWING DESCRIPTION

FIG. 1 is a vertical section through a reel embodying the invention;

FIG. 2 is a left side elevation on lines 2—2 of FIG. 1;

FIG. 3 is a right side elevation on lines 3—3 of FIG. 1; and

FIG. 4 is an enlarged fragmentary view of the reel, showing principles of operation; and FIG. 5 shows tape and leader interconnection.

DETAILED DESCRIPTION

In the drawings, the storage unit or reel 10 is used for storing tape in a pack 11 wound about a reel hub 12. FIG. 5 shows the end portion 11a of the tape to which a leader 13 is spliced, as via connection strip 14. The tape typically consists of magnetic tape used for recording purposes, and its width "$w_1$", is less than that "$w_2$" of the leader.

The reel 10 has an axis 15, and two rigid, protective flanges 16 and 17 extending normal to that axis and suitably connected to the hub, as by fasteners 18 and 19. The flanges extend in axially spaced generally parallel relation, to protect the tape pack 11 wound about the hub; accordingly, should the reel be dropped, the tape will be substantially protected against impact with external objects. The flanges may for example consist of metal, hard synthetic plastic, or other material, so as not to deflect relative to the hub or to one another when the tape and leader are wound about the hub. The hub may consist for example of lightweight metal.

In accordance with the invention, a disc 20 extends annularly about axis 15 between the flanges, and in adjacent relation to one flange, i.e. flange 16 for example. The disc, which may consist of yieldably flexible material such as plastic, extends generally parallel to the flanges, but its outermost annular extent 20a is characterized as locally and circumferentially progressively deflectible axially toward the one flange 16 in response to interference engagement with the leader strip as the latter is wound into the space 22 between the disc and the other flange as the reel rotates. In this regard, the reel may be rotated, for example, by a belt drive as disclosed in U.S. Pat. No. 4,054,923. Merely for purposes of illustration, a drive belt is shown at 23 in FIG. 2. Also a tape guide is indicated at 24, to guide the tape into space 22, with clearance at opposite sides of the tape pack 11, indicated at 25 and 26 in FIG. 4.

FIGS. 1 and 4 also show that the one flange 16 facing the disc 20 has an outermost portion provided with annular relief to provide clearance 27 adjacent the disc to accommodate its local and annularly progressive yieldable deflection axially toward the one flange, as shown. Thus, for example, the annular relief may be provided by a frusto-conical or beveled surface 28 on the flange outermost portion. The disc outermost portion 20a facing the bevel is subject to yieldable deflection toward the bevel, as the wider leader strip engages the portion 20a. The bending stiffness of the disc is such as to accommodate entry of the leader between the portion 20a and the other disc 17 so that the leader closely winds one to two times about the tape pack. Thus the disc may typically have a thickness between about 0.025 and 0.040 inches for a reel between 2.25 and 3.25 inches in diameter. Also, some clearance 27 remains between disc portion 20a and the bevel 28 when the leader is wound about the tape pack.

Further, the sides of flanges 17 and of disc 20 facing the leader, are typically made somewhat irregular so as to frictionally retain the opposite edges of the leader strip against radially outward slippage when the leader is wound about the tape pack, and the disc portion 20a is deflected, as shown in FIG. 4. Such irregularity is shown at 30 and 31 in FIG. 4, and may for example consist of surface roughness, dimpling, knurling, etc. Alternatively, a high friction coating may be employed on the disc and flange 17. One such coating is rubber. Accordingly, no annular grooves need be formed in the disc or flange 17 to retain the leader strip, such a groove in the disc presenting problems due to disc deflection and thinness.

It will be seen that the disc is protected against damage due to its location between the two flanges.

Disc may be attached to flange 16, by fasteners 18, to shoulder on hub wall 31.

I claim:

1. In a storage unit for tape and an elongated leader strip connected with the tape, the overall width of the leader strip exceeding the overall width of the tape, combination comprising
   (a) a reel having an axis, two protective flanges extending normal to said axis, and a hub about which tape may be wound for storage between the flanges, the flanges being carried by the hub to extend in axially spaced, rigidly projecting, generally parallel relation,
   (b) and a disc extending annularly about said axis between said flanges and in adjacent relation to one flange, the disc extending generally parallel to said flanges but its outermost annular extent being substantially entirely protectively located between the two protective flanges and characterized as locally and circumferentially progressively yieldably deflectible axially toward said one flange in response to interference engagement with the leader strip being forcibly wound into the space between the disc and the other flange as the reel rotates about said axis, the radius of said outermost extent of the disc being no greater than the outermost radius of said one flange.

2. The combination of claim 1 wherein the side of said disc facing toward the other flange is irregular to frictionally retain one edge of the leader strip against outward slippage after the leader is tightly wound about said axis and into said space.

3. The combination of claim 2 wherein the side of said other flange facing toward said disc is irregular to frictionally retain the other edge of the leader strip against outward slippage after the leader is tightly wound about said axis and into said space.

4. The combination of claim 1 wherein the side of said one flange facing said disc has an outermost portion provided with annular relief to provide clearance adjacent the disc to accommodate said disc local and circumferentially progressive yieldable deflection, axially toward said one flange.

5. The combination of claim 4 wherein said annular relief is defined by a frusto-conical surface extent of said one flange outermost portion.

6. The combination of claim 1 wherein said disc consists of synthetic plastic material, and is substantially thinner than said one flange.

7. The combination of claim 1 including said tape and leader strip wound about said hub, said disc being deflected by the leader strip toward said one flange.

8. The combination of claim 5 including said tape and leader strip wound about said hub, the outer portion of the disc being deflected by said leader strip toward said frusto-conical surface of the one flange, the leader also engaging the other flange, and the leader strip protectively wound about the tape.

* * * * *